United States Patent [19]

Hofmann

[11] Patent Number: 5,086,243
[45] Date of Patent: Feb. 4, 1992

[54] ROTATION DETECTOR FOR A COMMUTATOR MOTOR EXCITED BY POLE UNITS

[75] Inventor: Manfred Hofmann, Hettstadt, Fed. Rep. of Germany

[73] Assignee: Siemens Aktiengesellschaft, Berlin & Munich, Fed. Rep. of Germany

[21] Appl. No.: 568,357

[22] Filed: Aug. 15, 1990

[30] Foreign Application Priority Data

Aug. 25, 1989 [EP] European Pat. Off. ........ 89115738.0

[51] Int. Cl.⁵ ............................................. H02K 11/00
[52] U.S. Cl. ..................................... 310/68 B; 310/42; 310/43; 310/71; 310/239; 310/249; 324/207.15
[58] Field of Search .............. 310/68 B, 171, 42, 43, 310/154, 239, 249, 233, 71; 324/173, 174, 207.15, 207.16, 207.25

[56] References Cited

U.S. PATENT DOCUMENTS

| | | | |
|---|---|---|---|
| 3,466,477 | 9/1969 | Newill | 310/68 B UX |
| 4,082,968 | 4/1978 | Jones | 310/68 B |
| 4,381,468 | 4/1983 | Adam | 310/239 |
| 4,619,588 | 10/1986 | Moore, III | 310/154 |
| 4,914,713 | 4/1990 | Mueller et al. | 388/805 |

FOREIGN PATENT DOCUMENTS

| | | |
|---|---|---|
| 0235443 | 9/1987 | European Pat. Off. . |
| 0307709 | 3/1989 | European Pat. Off. . |
| 3502442 | 7/1986 | Fed. Rep. of Germany . |
| 2039420 | 8/1980 | United Kingdom . |

*Primary Examiner*—R. Skudy
*Attorney, Agent, or Firm*—Kenyon & Kenyon

[57] ABSTRACT

A rotation detector has a one-piece universal brush rocker that includes a supporting body that is injection molded, particularly out of plastic. The measuring coil is held on the supporting body between the pole gaps of pole units on the stator side and the measuring coil's winding ends connected to the stripped ends of the brush shunts are cast in the universal brush rocker. This rotation detector guarantees a contacting between the winding ends of the measuring coil and the brush shunts retained on the brush rocker of the commutator motor, and features ease of assembly and lasting operational reliability.

16 Claims, 1 Drawing Sheet

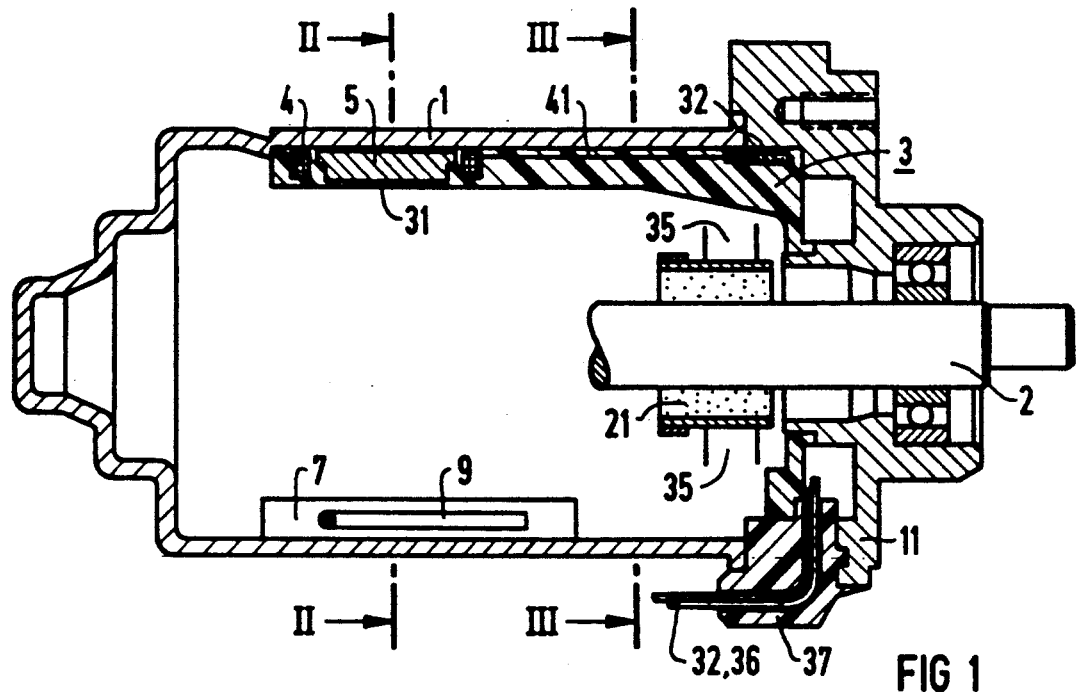
FIG 1
FIG 1a
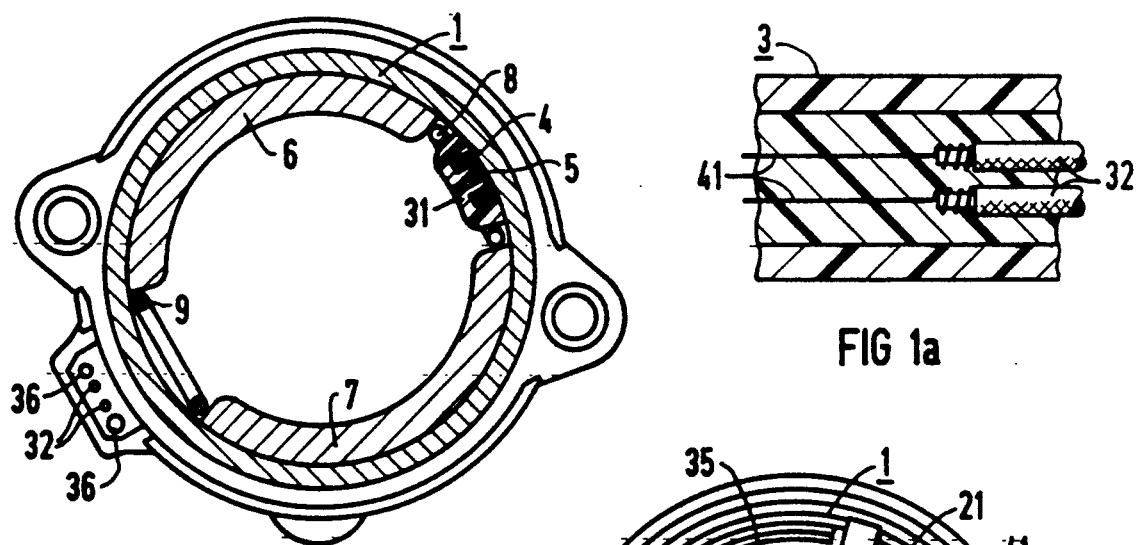
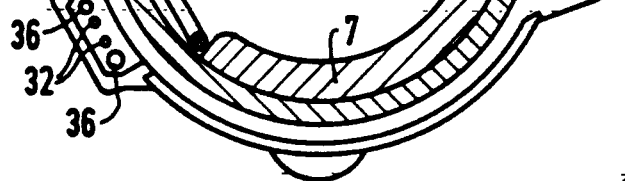
FIG 2
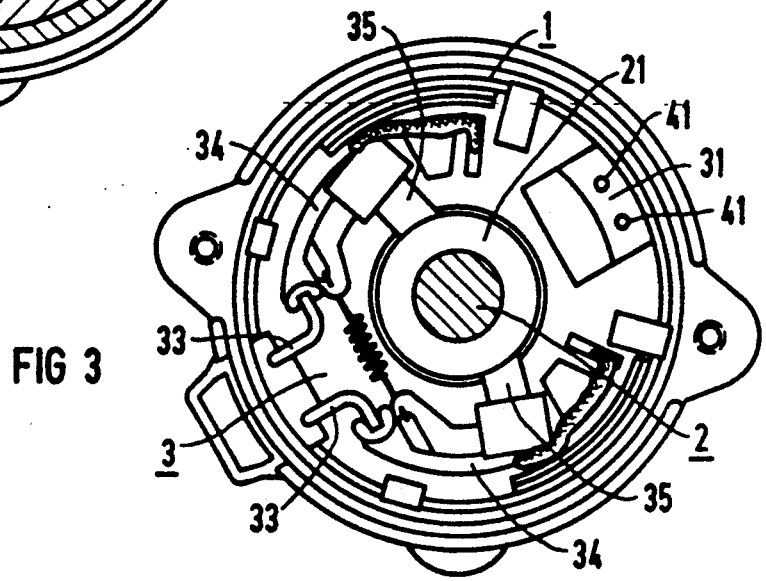
FIG 3

ROTATION DETECTOR FOR A COMMUTATOR MOTOR EXCITED BY POLE UNITS

BACKGROUND OF THE INVENTION

This invention relates generally to rotation detectors for commutator motors excited by pole units, and more particularly to an improved measuring coil for such a rotation detector A rotation detector for this type of commutator motor, which has a measuring coil mounted in at least one pole gap between the pole units on a supporting body, particularly one made of plastic, and which has winding terminations that are connected to brush shunts held on the brush rocker of the commutator is disclosed in EP-A1-0 307 709. As disclosed therein, a measuring coil is mounted in at least one pole gap between the pole units which may be partial-shell magnets or unit exciter poles. A current can be induced in the measuring coil by the pulsing of the stray field resulting in a current that has a slot-ripple frequency during the rotation of the rotor. This measuring coil is retained in a non-magnetic supporting body, particularly one made of plastic, which can be inserted between the partial-shell magnets or the unit exciter poles. The measuring coil is wound around an induction iron core, whose tangential extension is preferably smaller than the width of the slot opening and the tooth space of the slotted and toothed rotor respectively. The measuring coil and/or the induction iron core are inserted in pockets of the supporting body and preferably retained in these pockets by a locking fastener. The supporting body has measuring coil terminals for coupling to external leads. The inside ends of these terminals are coupled to the measuring coil. The external measuring coil terminals of the supporting body are able to be contacted by corresponding mating terminals for brush rocker shunts on a brush rocker. The supporting body that accommodates the external measuring coil terminals is designed as a discrete component in the assembly of the commutator motor. Likewise, the brush rocker is designed and mounted as a discrete component. This type of rotation detector is difficult to assemble and does not make a sufficiently reliable contact between the winding ends of the measuring coil and the brush shunts retained on the brush rocker of the commutator motor.

In view of this, the present invention is directed to the problem of further developing a rotation detector device which enables greater ease of assembly and more reliable contact between the winding ends of the measuring coil, on the one hand, and the brush shunts retained on the brush rocker of the commutator motor, on the other hand.

SUMMARY OF THE INVENTION

According to the present invention, in a commutator motor of the type described above, the universal brush rocker is a one piece unit that also includes the supporting body for the measuring coil, that is injection molded, particularly out of plastic. This component is then able to be inserted between the pole gaps in one assembly operation with a connection at the common holding part. The connection is capable of reliable preliminary contact between the winding ends of the measuring coil and the brush shunts. Then a simple reliable contact is made in a way which requires less engineering complexity. The measuring coil and/or the measuring coil induction core associated with the measuring coil, and the measuring coil winding ends, and the stripped ends of the internal brush shunts, are integrally cast as an insertion part in the universal brush rocker so that the winding ends and the stripped ends are insulated from each other. For contacting purposes, the stripped ends of the internal brush shunts have these measuring coil winding ends wound around and possibly soldered to them.

BRIEF DESCRIPTION OF THE DRAWINGS

FIG. 1 is a partial, longitudinal, sectional view of a commutator motor constructed according to the principles of the invention with a one-piece universal brush rocker, which accommodates both the brush apparatus as well as the measuring coil apparatus.

FIG. 1a is a sectional view showing the stripped ends of the brush shunts and winding terminations of the measuring coil wound around the stripped ends.

FIG. 2 the device of FIG. 1 in a sectional view sectional path II—II.

FIG. 3 is the device of FIG. 1 in a sectional view according to sectional path III—III.

DETAILED DESCRIPTION

Referring to FIG. 1, a permanent magnet excited, direct-current, low power motor is depicted with two partial-shell magnets 6 and 7. These two partial-shell magnets form corresponding pole gaps at the inner circumferential surface of a stator housing 1. The motor has a rotor, which is indicated in FIG. 1 only by a rotor shaft 2. The motor also has a commutator 21 and a slotted rotor laminated core on which a rotor armature is wound. The partial-shell magnets 6 and 7 are braced against each other at the circumferential surface of the stator housing 1 by means of fastening springs 8 and 9, also visible in FIG. 2. The fastening springs are inserted in the pole gaps between the end surfaces of the magnets, which are open towards the axial front end of the motor.

Referring to FIG. 2, a plastic supporting body 31, which accommodates a measuring coil induction core 5 with a measuring coil 4 wound around it, is mounted in the inner circumferential space of a fastening spring 8. The plastic supporting body 31 as shown in FIG. 1, is part of the one-piece universal brush rocker 3. The universal brush rocker 3 is inserted as a brush plate at the right front end of the stator housing 1 between the housing and an end shield 11. The universal brush rocker 3 has an axially protruding part which projects into the pole gap in which spring 8 in located and includes the plastic supporting body 31. The universal brush rocker 3 includes inter alia mounting supports 33 for securing hammer brush holders 34. The brushes 35 are attached to the free ends of the hammer brush holders 34 and contact the surface of the commutator 21.

The one-piece universal brush rocker 3 with the extruded plastic supporting body 31 is a preassembled part, with the measuring coil 4 and the measuring coil induction core 5, and all brush components on the stator side and in its preassembled form includes all internal electrical connections.

The terminals of the measuring coil 4 formed by winding ends 41 are connected inside the universal brush rocker 3 to the brush shunts 32. Brush shunts 32 include outer terminals brought out by means of a sealing bushing 37. Brush shunts 36, used for the voltage supply of the motor winding of the commutator motor, are brought out in a similar manner.

The brush shunts 32 are joined to the winding ends 41 of the measuring coil 4 and form a measuring line. The brush shunts 32 transmit signals from the measuring coil winding ends 41. The brush shunts 32 lead either to an internal rotation detection circuit and control system, on the universal brush rocker 3 itself or—as in the present embodiment—to the outside, to an external detection circuit and control system.

To ensure a simple and reliable contact between the measuring coil winding ends 41 and the brush shunts 32, the winding ends 41 of the measuring coil 4 are wound around the stripped ends of the internal brush shunts 32 (FIG. 1a), possibly soldered to these brush shunts 32 and, in an advantageous way, integrally cast as an insertion part in the universal brush rocker 3, so that the winding ends and the stripped ends are both insulated. Additionally, the universal brush rocker and cast measuring coil can be shaped such that they form a slide-in part which can be introduced into the pole gap.

What is claimed is:

1. A rotation detector for use in a commutator motor having at least two pole units separated by pole gaps comprising:
    a one-piece injection molded universal brush rocker including a supporting body of a size to fit in the pole gaps between two said pole units;
    a measuring coil disposed in said supporting body;
    brush shunts supported by said brush rocker; and
    winding terminations leading from said measuring coil to said brush shunts.

2. The rotation detector according to claim 1, wherein said measuring coil is integrally cast in said universal brush rocker.

3. The rotation detector according to claim 1, further comprising a measuring coil core, wherein said measuring coil is wound around said measuring coil core and said measuring coil and said measuring coil core are integrally cast in said universal brush rocker.

4. The rotation detector according to claim 3 wherein the brush shunts have stripped ends and said winding terminations of said measuring coil are wound around said stripped ends.

5. The rotation detector according to claim 2 wherein the brush shunts have stripped ends and said winding terminations of said measuring coil are wound around said stripped ends.

6. The rotation detector according to claim 3 wherein the brush shunts have stripped ends and said winding terminations of said measuring coil are wound around said stripped ends.

7. The rotation detector according to claim 1 wherein the brush shunts have stripped ends and said winding terminations of said measuring coil are-soldered to said stripped ends.

8. The rotation detector according to claim 2 wherein the brush shunts have stripped ends and said winding terminations of said measuring coil are soldered to said stripped ends.

9. The rotation detector according to claim 3 wherein the brush shunts have stripped ends and said winding terminations of said measuring coil are soldered to said stripped ends.

10. The rotation detector according to claim 1 wherein the brush shunts have stripped ends and said winding terminations of said measuring coil are wound around said stripped ends and soldered to said stripped ends.

11. The rotation detector according to claim 2 wherein the brush shunts have stripped ends and said winding terminations of said measuring coil are wound around said stripped ends and soldered to said stripped ends.

12. The rotation detector according to claim 3 wherein the brush shunts have stripped ends and said winding terminations of said measuring coil are wound around said stripped ends and soldered to said stripped ends.

13. A rotation detector according to claim 4, wherein said winding terminations of said measuring coil and said stripped ends of the brush shunts are integrally cast in said universal brush rocker so that said winding terminations and said stripped ends are insulated from each other.

14. A rotation detector according to claim 7, wherein said winding terminations of said measuring coil and said stripped ends of the brush shunts are integrally cast in the universal brush rocker so that said winding terminations and said stripped ends are insulated from each other.

15. A rotation detector according to claim 10, wherein said winding terminations of said measuring coil and said stripped ends of the brush shunts are integrally cast in the universal brush rocker so that said winding terminations and said stripped ends are insulated.

16. The rotation detector according to claim 2, wherein said universal brush rocker and cast measuring coil are shaped to form a slide-in part which can be introduced into the pole gap.

* * * * *